US011456691B2

(12) United States Patent
Choi et al.

(10) Patent No.: US 11,456,691 B2
(45) Date of Patent: Sep. 27, 2022

(54) INVERTER CONTROL DEVICE

(71) Applicant: LS ELECTRIC CO., LTD., Anyang-si (KR)

(72) Inventors: Seung-Cheol Choi, Anyang-si (KR); Hak-Jun Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 15 days.

(21) Appl. No.: 17/293,622

(22) PCT Filed: Aug. 7, 2019

(86) PCT No.: PCT/KR2019/009873
§ 371 (c)(1),
(2) Date: May 13, 2021

(87) PCT Pub. No.: WO2020/105838
PCT Pub. Date: May 28, 2020

(65) Prior Publication Data
US 2022/0014138 A1 Jan. 13, 2022

(30) Foreign Application Priority Data
Nov. 21, 2018 (KR) .................. 10-2018-0144315

(51) Int. Cl.
*H02P 27/08* (2006.01)
*H02M 7/5395* (2006.01)
*H02P 21/14* (2016.01)

(52) U.S. Cl.
CPC .......... *H02P 27/08* (2013.01); *H02M 7/5395* (2013.01); *H02P 21/14* (2013.01)

(58) Field of Classification Search
CPC .. H02P 21/00; H02P 21/0003; H02P 21/0021; H02P 21/0085; H02P 21/04;
(Continued)

(56) References Cited

U.S. PATENT DOCUMENTS 5,986,428 A 11/1999 Kono et al.
9,007,004 B2* 4/2015 Hunter ................ H02P 21/0003
318/609

(Continued)

FOREIGN PATENT DOCUMENTS

JP H 06253576 A 9/1994
JP 2016096666 A 5/2016
(Continued)

OTHER PUBLICATIONS

International Search Report for related International Application No. PCT/KR2019/009873; dated May 28, 2020; (5 pages).
(Continued)

*Primary Examiner* — Antony M Paul
(74) *Attorney, Agent, or Firm* — K&L Gates LLP

(57) ABSTRACT

The present disclosure provides an inverter control device which estimates back electromotive force of an induction motor, and which uses a torque current and a flux current so as to calculate a slip frequency and compensate for same, thereby enabling the motor to operate at a constant speed. To this end, the present invention may comprise: a command voltage generating unit for outputting, to an inverter, a three phase PWM voltage with respect to a command frequency on the basis of a voltage/frequency operation; and a slip frequency determining unit for determining a slip frequency on the basis of a phase current and a phase voltage of a motor driven by the inverter.

8 Claims, 13 Drawing Sheets

(58) Field of Classification Search
CPC .......... H02P 21/06; H02P 21/08; H02P 21/09;
H02P 21/10; H02P 21/14; H02P 21/16;
H02P 21/22; H02P 21/26; H02P 21/30;
H02P 21/50; H02P 23/00; H02P 23/0086;
H02P 23/07; H02P 23/08; H02P 23/14;
H02P 23/18; H02P 23/22; H02P 25/089;
H02P 25/107; H02P 25/145; H02P 27/00;
H02P 27/04; H02P 27/06; H02P 27/08;
H02P 27/085; H02P 1/00; H02P 1/04;
H02P 1/16; H02P 1/163; H02P 1/26;
H02P 1/42; H02P 1/426; H02P 1/46;
H02P 3/00; H02P 4/00; H02P 5/00; H02P
6/00; H02P 6/04; H02P 6/06; H02P
6/157; H02P 6/182; H02P 6/28; H02P
6/32; H02P 7/00; H02P 7/29; H02P 9/00
See application file for complete search history.

(56) References Cited

U.S. PATENT DOCUMENTS 9,136,790 B2    9/2015  Park et al.
9,819,294 B2   11/2017  Park et al.

FOREIGN PATENT DOCUMENTS

| KR | 20080062830 A | 7/2008 |
| KR | 101073688 B1 | 10/2011 |
| KR | 20140014734 A | 2/2014 |
| KR | 101530543 B1 | 6/2015 |
| KR | 20160109859 A | 9/2016 |

OTHER PUBLICATIONS

Written Opinion for related International Application No. PCT/KR2019/009873; dated May 28, 2020; (6 pages).
Korean Notice of Allowance dated May 14, 2021 issued in corresponding Korean Application No. 10-2018-0144315—2 Pages.
Extended European Search Report for related European Application No. 19887848.0; dated Dec. 1, 2021; (11 pages).
Hui Luo et al: "A Novel V/f Scalar Controlled Induction Motor Drives with Compensation Based on Decoupled Stator Current", Industrial Technology, 2006. ICIT 2006. IEEE International Conference On, IEEE, PI, Dec. 1, 2006; (6 pages).
Yang Zeyu et al: "A new slip compensation method for induction motors based on current vector decoupling", 2017 20th International Conference on Electrical Machines and Systems (ICEMS), IEEE, Aug. 11, 2017; (6 pages).

* cited by examiner

INVERTER CONTROL DEVICE

CROSS-REFERENCE TO RELATED APPLICATIONS

The present application is a National Stage of International Application No. PCT/KR2019/009873 filed on Aug. 7, 2019, which claims the benefit of Korean Patent Application No. 10-2018-0144315, filed on Nov. 21, 2018, filed with the Korean Intellectual Property Office, the entire contents of each hereby incorporated by reference.

FIELD

The present disclosure relates to an inverter control device.

BACKGROUND

In general, an inverter refers to a power conversion device that converts an input commercial AC (alternating current) power to a DC (direct current) power and then converts the DC power to an AC power suitable for a motor and supplies the same to the motor. In this connection, the inverter is widely used in a system that is required for a variable speed operation in which a magnitude and a frequency of the AC power to be supplied to the motor may be controlled.

The inverter is based on a power semiconductor, and has various topologies according to applications thereof. Depending on the topologies, a magnitude, and the number of levels of an output voltage and a voltage synthesis scheme may vary. 3-phases half-bridge inverters are mainly used as industrial inverters. The 3-phases half-bridge inverter has a structure in which three single-phase half-bridge inverters are connected to each other in a parallel manner, and each half bridge is a basic circuit that constitutes an inverter referred to as a pole, an arm or a leg.

An induction motor which is widely used in the industry may control a frequency in a voltage/frequency (V/f) operation, and thus is mainly used in fields such as fans, pumps, and blowers that do not require fast dynamics in an operation region below a rated speed.

However, since a slip frequency may occur according to an application in which a load is variable, a constant speed operation is impossible. In particular, in a field where a constant speed operation is required as in a conveyor, the slip frequency must be properly compensated for so that an actual operation speed is equal to a command speed. In other words, inverter control is required to remove a speed error due to the slip frequency in the voltage/frequency operation to enable the constant speed operation regardless of the load.

FIG. 1 is a control block diagram showing an inverter control device according to a prior art.

Referring to FIG. 1, the inverter control device may include a motor 10, an inverter 20 and an inverter controller 30.

The inverter controller 30 may include a command voltage generating unit 40 and a slip frequency determining unit 50.

The command voltage generating unit 40 may output 3-phases PWM voltage $V_{abc\_PWM}$ to the inverter 20. In this connection, the inverter 20 may operate using the 3-phases PWM voltage $V_{abc\_PWM}$ to provide 3-phases output voltage $V_{abcn}$ to the motor 10.

In this connection, the command voltage generating unit 40 may receive a command frequency $w_{ref}$ and generate a command voltage of the inverter 20 corresponding to the command frequency $w_{ref}$ based on the voltage/frequency (V/f) operation. In this connection, the command voltage generating unit 40 may generate the 3-phases PWM voltage $V_{abc\_PWM}$ as the command voltage such that a ratio of an output voltage $V_{V/f}$ and an operation frequency $w_{V/f}$ is constant.

The slip frequency determining unit 50 may generate a slip frequency $w_{slip\_comp}$ corresponding to a speed error. In this connection, the inverter controller 30 may reduce the speed error by adding the slip frequency $w_{slip\_comp}$ to the command frequency $w_{ref}$.

FIG. 2 is a block diagram showing in detail the command voltage generating unit shown in FIG. 1.

Referring to FIG. 2, the command voltage generating unit 40 may include a voltage determining unit 41, an integrator 42, a trigonometric function application unit 43, a multiplier 44, and a PWM output unit 45.

The voltage determining unit 41 may determine a magnitude of the output voltage $V_{V/f}$ from the operation frequency $w_{V/f}$.

Further, the integrator 42 may integrate the operation frequency $w_{V/f}$ and outputs a phase $\theta_{V/f}$. The trigonometric function application unit 43 may output a phase value obtained by applying the phase $\theta_{V/f}$ to a set trigonometric function.

Thereafter, the multiplier 44 may output command voltages $V_{as\_ref}$, $V_{bs\_ref}$ and $V_{cs\_ref}$ as 3-phases AC sine waves, based on the phase value.

The PWM output unit 45 may synthesize as the 3-phases PWM voltage $V_{abc\_PWM}$ corresponding to the command voltages $V_{as\_ref}$, $V_{bs\_ref}$ and $V_{cs\_ref}$.

FIG. 3 is an example diagram to illustrate a frequency-voltage relationship.

FIG. 3 shows that the output voltage $V_{V/f}$ increases in proportion to the operation frequency $w_{V/f}$.

According to the relationship between the operation frequency $w_{V/f}$ and the output voltage $V_{V/f}$ shown in FIG. 3, the voltage determining unit 41 may determine a magnitude of the output voltage $V_{V/f}$ from the operation frequency $w_{V/f}$.

At an initial start-up of the inverter 20, the operation frequency $w_{V/f}$ of the inverter 20 starts from 0, and thus a small voltage may be output. As the frequency increases, a voltage having a magnitude proportional thereto may be output. Thereafter, when the operation frequency $w_{V/f}$ of the inverter 20 reaches a target frequency $w_{ref}$, the operation frequency $w_{V/f}$ is no longer increased such that a constant speed operation is performed.

FIG. 4 is a circuit diagram showing the inverter shown in FIG. 1.

Referring to FIG. 4, the inverter 20 may include a DC voltage providing unit 22 and an inverter unit 24.

The DC voltage providing unit 22 may supply charged DC voltage to the inverter unit 24.

The inverter unit 24 may convert the DC voltage supplied from the DC voltage providing unit 22 into 3-phases AC output voltages $V_{an}$, $V_{bn}$, and $V_{cn}$. Then, the inverter unit 24 may supply the 3-phases AC output voltages $V_{an}$, $V_{bn}$, and $V_{cn}$ to the motor 10.

The three-phases AC output voltages $V_{an}$, $V_{bn}$, and $V_{cn}$ may be determined according to ON/OFF states of 3-phases switches of the inverter unit 24.

Two switches are connected to each other in series in a leg of each phase. The 3 phases operates independently of each other, thereby generating the output voltages $V_{an}$, $V_{bn}$, and $V_{cn}$. The output voltages $V_{an}$, $V_{bn}$, and $V_{cn}$ of the 3 phases are controlled to have a phase difference of 120 degrees therebetween.

The DC voltage providing unit 22 may include a capacitor or a battery, and may maintain a constant voltage. The switches of the inverter unit 24 may convert the DC voltage into the AC voltage.

The inverter controller 30 may output, to the inverter unit 24, the 3-phases PWM voltage $V_{abc\_PWM}$ which determines a switching state of the inverter unit 24 so that the motor 10 rotates at a speed corresponding to the command frequency.

FIG. 5 is a detailed block diagram of the slip frequency determining unit shown in FIG. 1.

Referring to FIG. 5, the slip frequency determining unit 50 may include a first coordinate converting unit 51, a second coordinate converting unit 52, a multiplier 53, an output power determining unit 54, a calculator 55, slip frequency calculating unit 56 and a filter 57.

First, the first coordinate converting unit 51 may convert 3-phases abc-axis currents $I_{as}$, $I_{bs}$, and $I_{cs}$ into a stationary coordinate system dq-axis currents $I_{dss}$ and $I_{qss}$. Further, the second coordinate converting unit 52 may convert the stationary coordinate system dq-axis currents $I_{dss}$ and $I_{qss}$ into rotation coordinate system currents $I_{dse}$ and $I_{qse}$.

The stationary coordinate system dq-axis currents $I_{dss}$, and $I_{qss}$, and the rotation coordinate system currents $I_{dse}$, and $I_{qse}$ may be obtained using a following [Equation 1].

$$I_{dss} = \frac{2I_{as} - I_{bs} - I_{cs}}{3}, \quad I_{qss} = \frac{I_{bs} - I_{cs}}{\sqrt{3}}, \quad \text{[Equation 1]}$$

$$I_{dse} = I_{dss}\cos(\theta_{v/f}) + I_{dss}\sin(\theta_{v/f}),$$

$$I_{qse} = -I_{dss}\sin(\theta_{v/f}) + I_{qss}\cos(\theta_{v/f})$$

The multiplier 53 may multiply a magnitude of the output voltage $V_{V/f}$ and an active current $I_{qse}$ with each other. The output power determining unit 54 may determine an output power $P_{load}$ based on the number of poles and the result from the multiplier 53.

The calculator 55 may determine an output torque $T_{load}$ by dividing the output power $P_{load}$ by the operation frequency $w_{V/f}$. The slip frequency calculating unit 56 may apply a ratio of a rated slip frequency $w_{slip\_rated}$ and a rated torque $T_{rated}$ to the output torque $T_{load}$. The filter 57 may determine the slip frequency $w_{slip\_comp}$ via low-band filtering.

In this connection, a phase angle used to determine the active current $I_{qse}$ may be a command phase angle $\theta_{V/f}$ relative to the operation frequency $w_{V/f}$.

The voltage/frequency control as described above is a motor operation scheme that is widely used in the industry, and enables speed control and is easily implemented. However, a speed accuracy is lowered because the motor rotates at a speed different from a speed input by the user due to an increase in the slip frequency under an operation condition having a high load.

In order to compensate for the lowered speed accuracy, the inverter controller 30 may appropriately compensate for the slip frequency to increase the operation frequency of the inverter 20. As described above, the slip frequency compensation scheme in the prior art calculates the output power and the torque of the inverter, and estimates the slip frequency based on the ratio of the slip frequency and the torque.

However, in calculation of the output torque, the torque is calculated by approximating the operation frequency of the inverter 20 and the rotation frequency of the actual motor 10 to each other. In a low speed operation region, an error between the operation frequency of inverter 20 and the rotation frequency of motor 10 is relatively large and a loss effect of the motor 10 is large. Thus, it is difficult to accurately calculate the output power, the torque and the slip frequency.

SUMMARY

A purpose of the present disclosure is to provide an inverter control device of estimating an back electromotive force of an induction motor, and calculating and compensating for a slip frequency using a torque-based current and a magnetic flux-based current, such that the motor performs a constant speed operation.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

An inverter control device according to the present disclosure may include a command voltage generating unit configured to receive a command frequency and output 3-phases PWM voltage to an inverter, based on voltage/frequency operation; and a slip frequency determining unit configured to determine a slip frequency based on phase current and phase voltage of a motor driven by the inverter, wherein the slip frequency determining unit includes: a coordinate converting unit configured to: convert the phase current and the phase voltage of the motor to dq-axis phase currents and phase voltages of a stationary coordinate system; and apply a command phase angle to the dq-axis phase currents and phase voltages to convert the dq-axis phase currents and phase voltages to dq-axis currents and voltages of a rotation coordinate system; a disturbance measurement unit configured to: estimate a back electromotive force of a rotor from the dq-axis currents and voltages; and estimate a phase angle of the rotor from the back electromotive force of the motor; a current estimating unit configured to apply the phase angle of the rotor to the dq-axis phase currents to convert the dq-axis phase currents to a torque-based current and a magnetic flux-based current of the rotation coordinate system; and a frequency estimating unit configured to output an estimated slip frequency based on the torque-based current, the magnetic flux-based current and a rotor time constant.

The coordinate converting unit may include: a first converting unit configured to convert the phase current and the phase voltage of the motor into the dq-axis phase currents and phase voltages; and a second converting unit configured to apply a value obtained by applying a trigonometric function to the command phase angle to the dq-axis phase currents and phase voltages to convert the dq-axis phase currents and phase voltages to the dq-axis currents and voltages.

The disturbance measurement unit may include: a back electromotive force estimating unit configured to apply a stator resistance and a leakage inductance to the dq-axis currents and voltages and pass the dq-axis currents and voltages through a low-pass filter to estimate a back electromotive force of the rotor; and a phase angle estimating unit configured to estimate the phase angle of the rotor from the back electromotive force of the motor.

The back electromotive force estimating unit may be configured to estimate the back electromotive force of the rotor based on a following [Equation]:

$$E_{dqrs\_est} = \frac{\frac{K_p}{\sigma L_s}s + \frac{K_i}{\sigma L_s}}{s^2 + \frac{K_p}{\sigma L_s}s + \frac{K_i}{\sigma L_s}}(V_{dqss} - R_s i_{dqss} - s\sigma L_s i_{dqss}),$$

where $E_{dqrs\text{-}est}$ is the back electromotive force, Kp and Ki are respectively gains of a proportional controller and a proportional integral controller, $R_s$ is the stator resistance, s is a Laplace operator, $\sigma L_s$ is the leakage inductance, $V_{dqss}$ is the dq-axis voltage, and $i_{dqss}$ is the dq-axis current.

The phase angle estimating unit may include: a magnetic flux converting unit configured to convert the back electromotive force of the motor into a rotation coordinate system back electromotive force phase angle; a proportional integral controller configured to adjust a q-axis component of the back electromotive force phase angle to 0 to output a frequency of the rotor magnetic flux; and an integrator configured to integrate the frequency of the rotor magnetic flux to output the phase angle of the rotor magnetic flux.

The phase angle estimating unit may further include a low-pass filter configured to pass the estimated slip frequency therethrough to output a compensated slip frequency.

The current estimating unit may be configured to apply a value obtained by applying a trigonometric function to the phase angle of the rotor magnetic flux to the dq-axis phase currents to convert the dq-axis phase currents to a torque-based current and a magnetic flux-based current.

The frequency estimating unit may be configured to output the estimated slip frequency based on a following [Equation]:

$$\omega_{slip\_est} = \frac{1}{T_r} \cdot \frac{I_{torque}}{I_{Flux}},$$

wherein $w_{slip\_est}$ is the estimated slip frequency, $T_r$ is the rotor time constant, $I_{torque}$ is the torque-based current, and $I_{flux}$ is the magnetic flux-based current.

The inverter control device according to the present disclosure estimates the back electromotive force and the phase angle of the rotor magnetic flux without phase distortion using the disturbance measurement unit, and estimates and compensates for the slip frequency using the torque-based current and the magnetic flux-based current calculated based on the estimated phase angle of the rotor magnetic flux, such that the inverter may operate at a constant speed regardless of a load.

Further, the inverter control device according to the present disclosure may be applicable to both a low speed operation region and a high speed operation region and thus may easily control the inverter.

In addition to the above-described effects, specific effects of the present disclosure will be described together while describing specific details for carrying out the disclosure.

DETAILED DESCRIPTION

Figure 1:
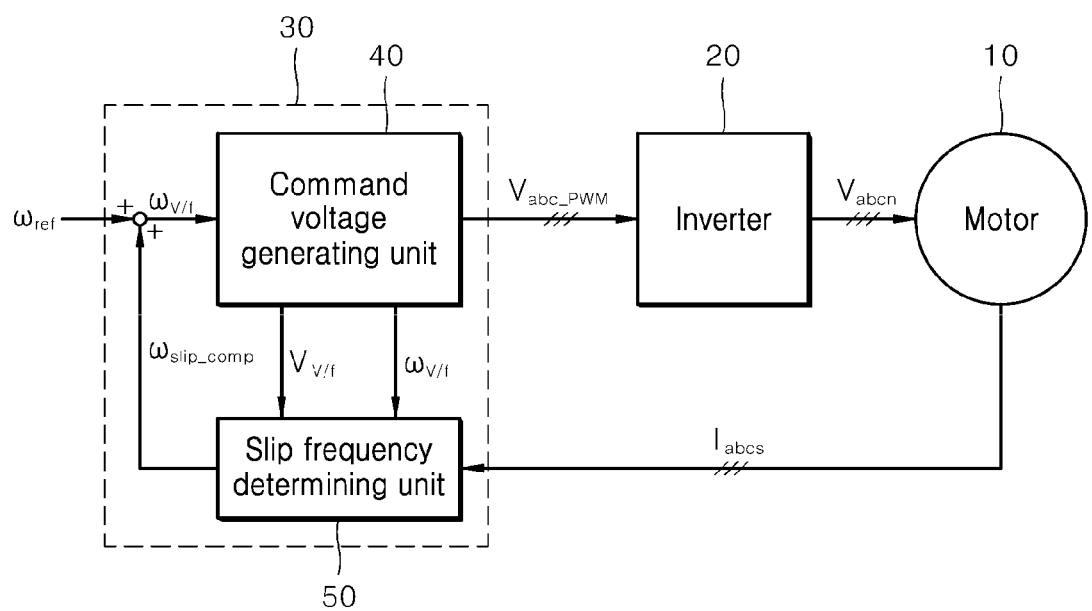
FIG. 1 is a control block diagram showing an inverter control device according to the prior art.
Figure 2:
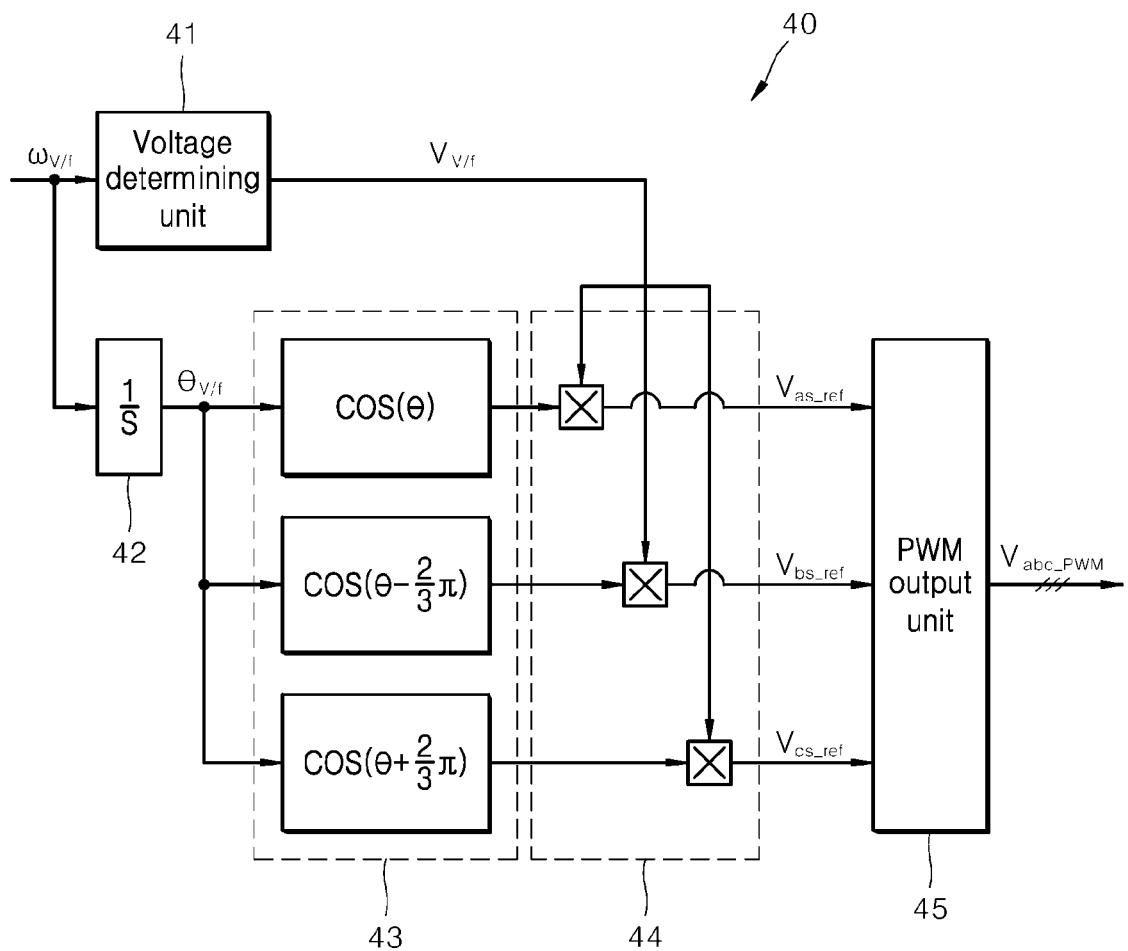
FIG. 2 is a block diagram showing in detail the command voltage generating unit shown in FIG. 1.
Figure 3:
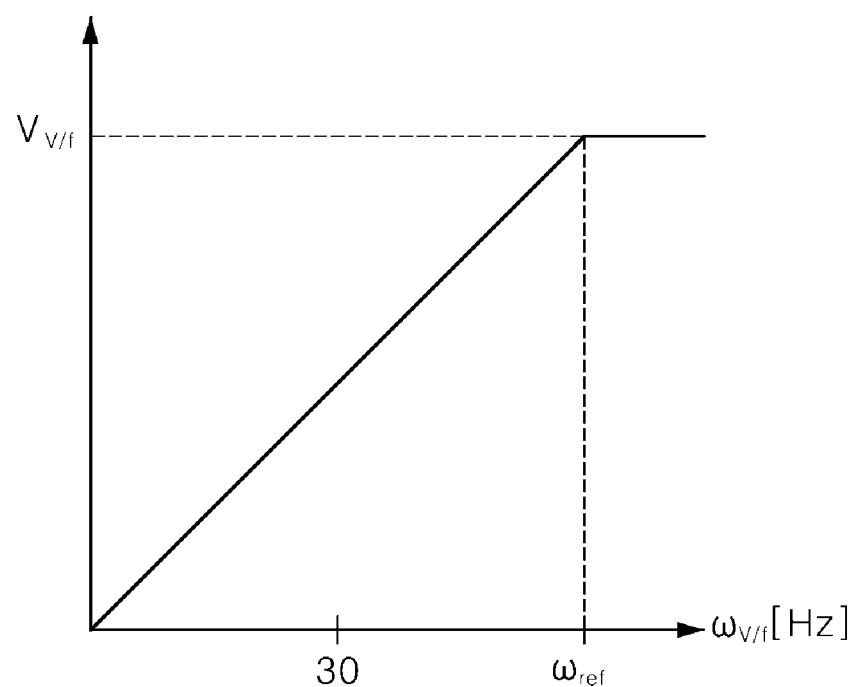
FIG. 3 is an example diagram to illustrate the frequency-voltage relationship.
Figure 4:
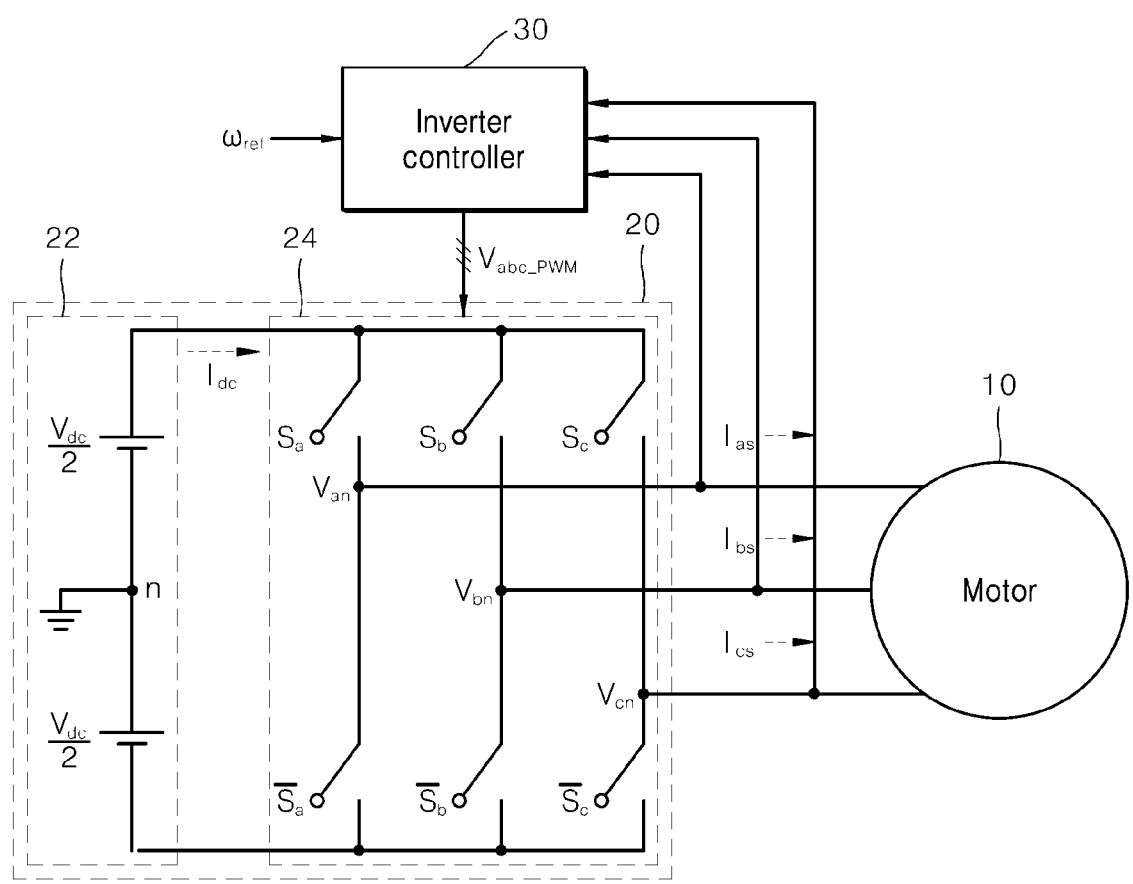
FIG. 4 is a circuit diagram showing the inverter shown in FIG. 1.
Figure 5:
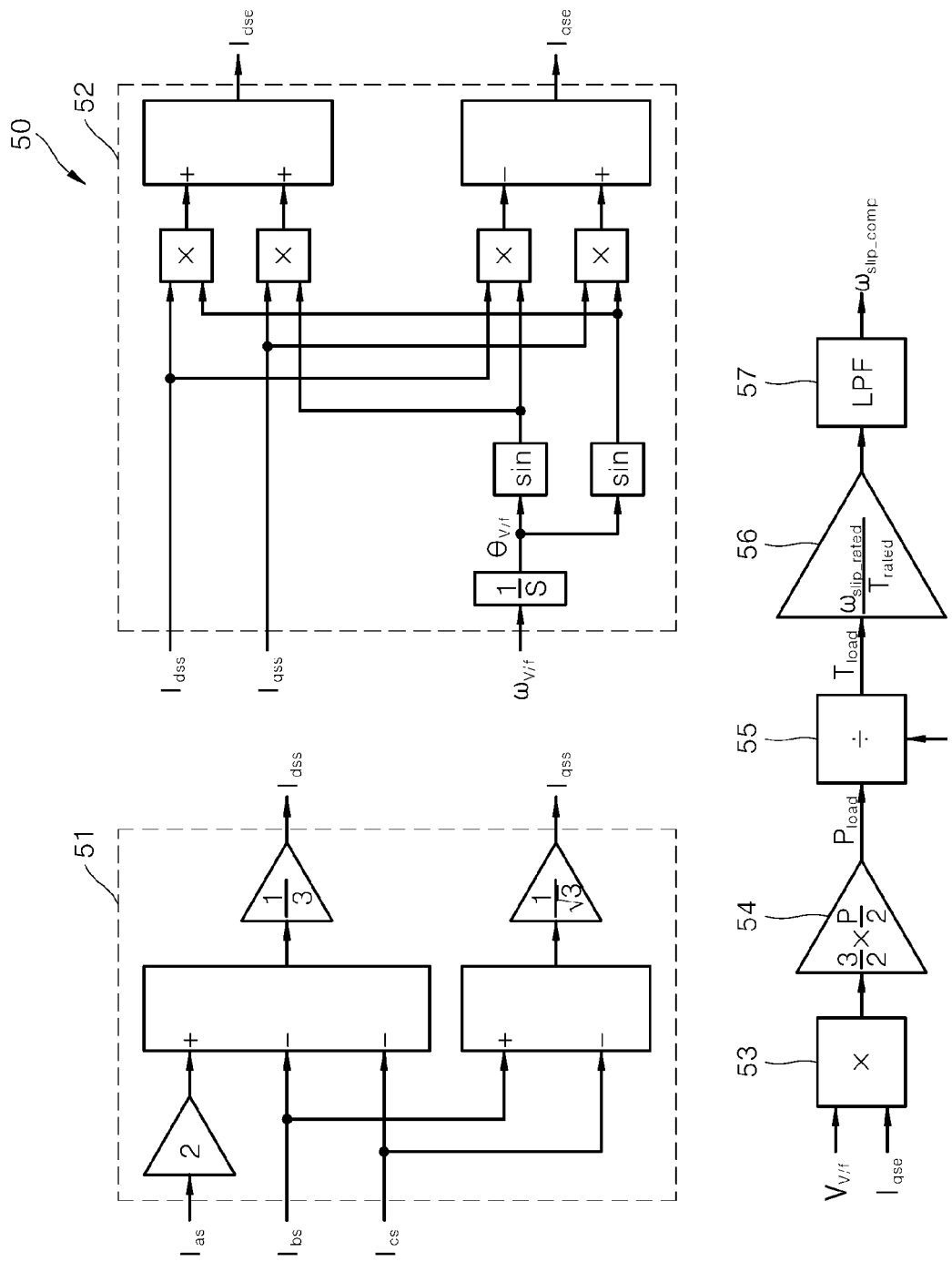
FIG. 5 is a detailed block diagram of the slip frequency determining unit shown in FIG. 1.

The above-described objects, features, and advantages will be described later in detail with reference to the accompanying drawings, and accordingly, a person having ordinary knowledge in the technical field to which the present disclosure belongs may easily implement the technical idea of the present disclosure. In describing the present disclosure, when it is determined that a detailed description of a known component related to the present disclosure may unnecessarily obscure gist of the present disclosure, the detailed description is omitted.

Hereinafter, exemplary embodiments according to the present disclosure will be illustrated in detail with reference to the accompanying drawings. In the drawings, the same reference numerals indicate the same or similar elements.

Hereinafter, an inverter control device according to one embodiment of the present disclosure will be described.

Figure 6:
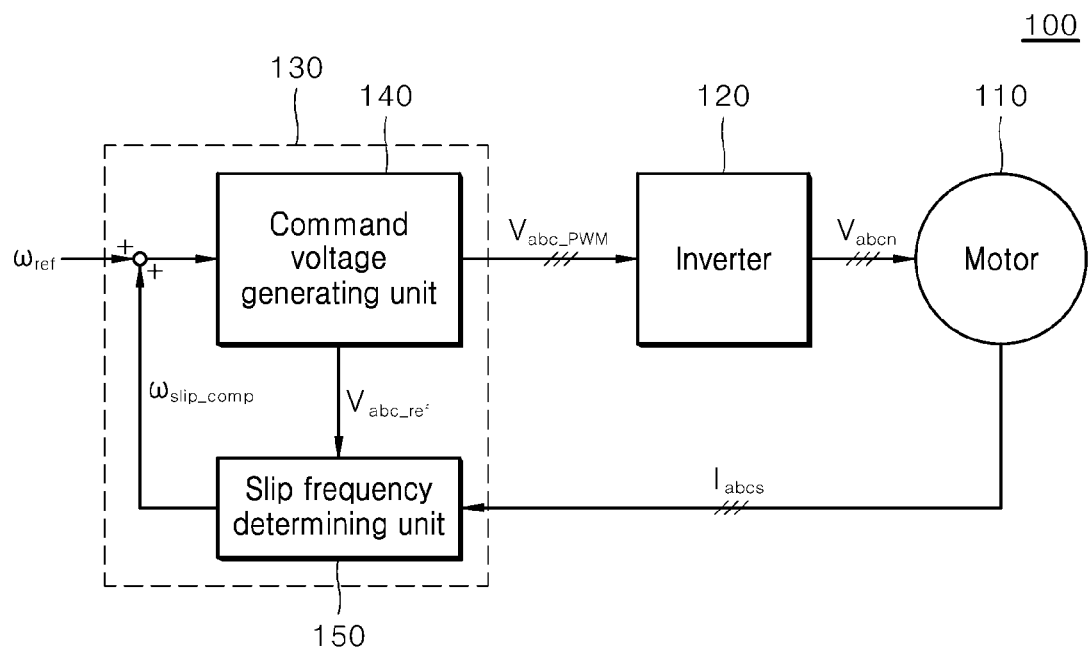
FIG. 6 is a schematic block diagram of an inverter control device according to the present disclosure.

FIG. 6 is a schematic block diagram of an inverter control device according to the present disclosure.

Referring to FIG. 6, an inverter control device 100 may include a motor 110, an inverter 120 and an inverter controller 130.

In this connection, the motor 110 and the inverter 120 are the same as the motor 10 and the inverter 20 included in the inverter control device shown in FIG. 1. Thus, the descriptions thereof are omitted herein.

The inverter controller 130 may include a command voltage generating unit 140 and a slip frequency determining unit 150. Unlike the inverter controller 30 included in the inverter control device shown in FIG. 1, the inverter controller 130 may directly estimate a rotor magnetic flux and calculate a phase angle using stator voltage and current of the motor 120.

The command voltage generating unit 140 may receive a frequency corresponding to a sum of a command frequency $w_{ref}$ and a compensation slip frequency $w_{slip\_comp}$ as an operation frequency. In this connection, the command voltage generating unit 140 may generate 3-phases PWM voltage $V_{abc\_PWM}$ as a command voltage of the inverter 120 corresponding to the operation frequency, and having a constant ratio of output voltage and frequency, based on voltage/frequency (V/f) operation.

The command voltage generating unit 140 may output the 3-phases PWM voltage $V_{abc\_PWM}$ to the inverter 120. In this connection, the inverter 120 may operate using the 3-phases PWM voltage $V_{abc\_PWM}$ to provide 3-phases output voltage $V_{abcn}$ to the motor 110.

The slip frequency determining unit 150 may determine the slip frequency using phase current and phase voltage of the motor 110. Further, the slip frequency determining unit 150 may estimate the back electromotive force of the motor 110 from the phase current $I_{abcs}$ and the phase voltage $V_{abcs}$ of the motor 110, and may estimate a phase angle $\theta_{est}$ of the rotor magnetic flux from the back electromotive force of the motor 110. Further, the slip frequency determining unit 150 may compensate for the slip frequency from a relationship between the current and the slip frequency based on the phase angle $\theta_{est}$ of the rotor magnetic flux.

Figure 7:
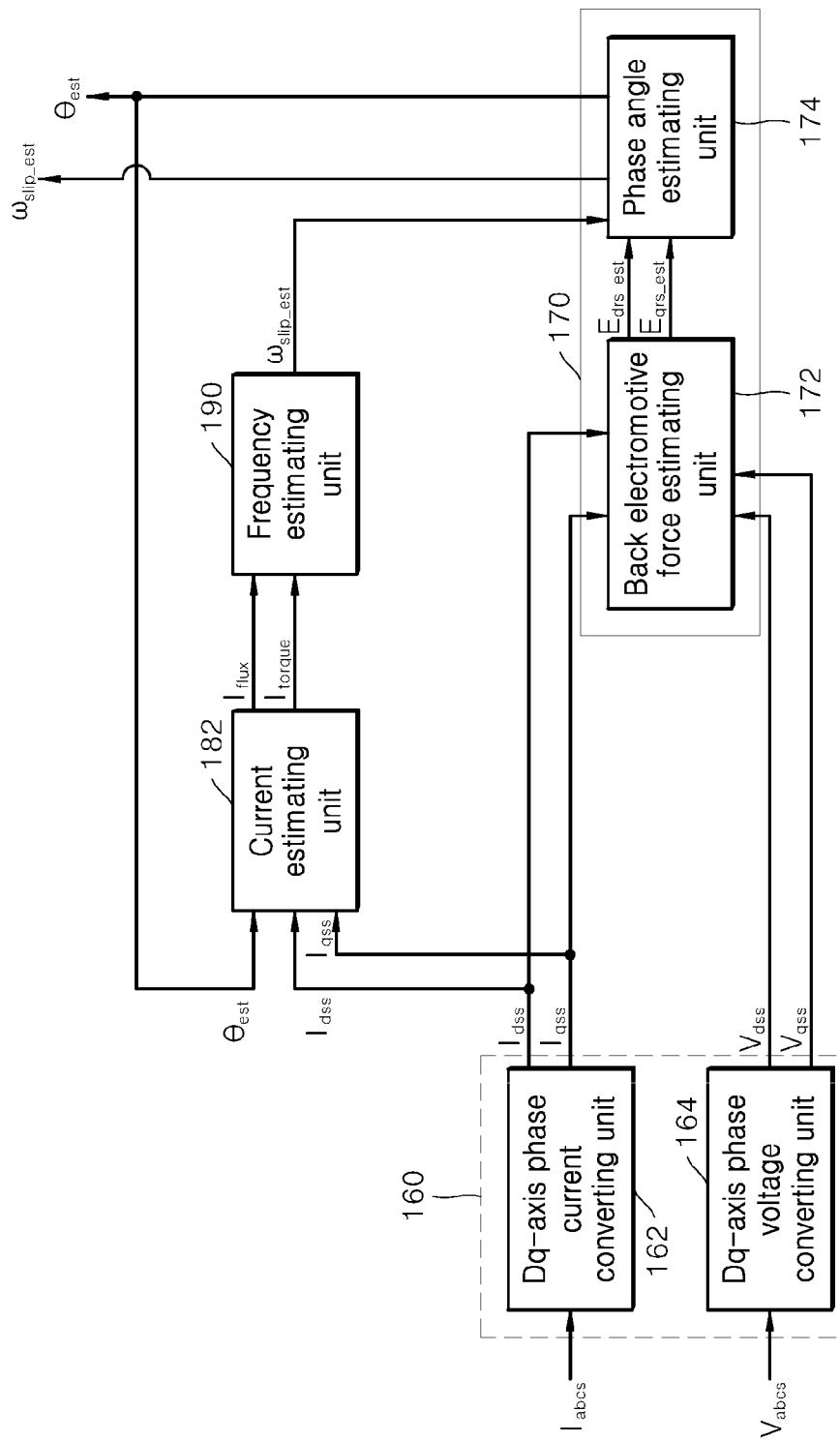
FIG. 7 is a block diagram showing a slip frequency determining unit shown in FIG. 6.
Figure 8A:
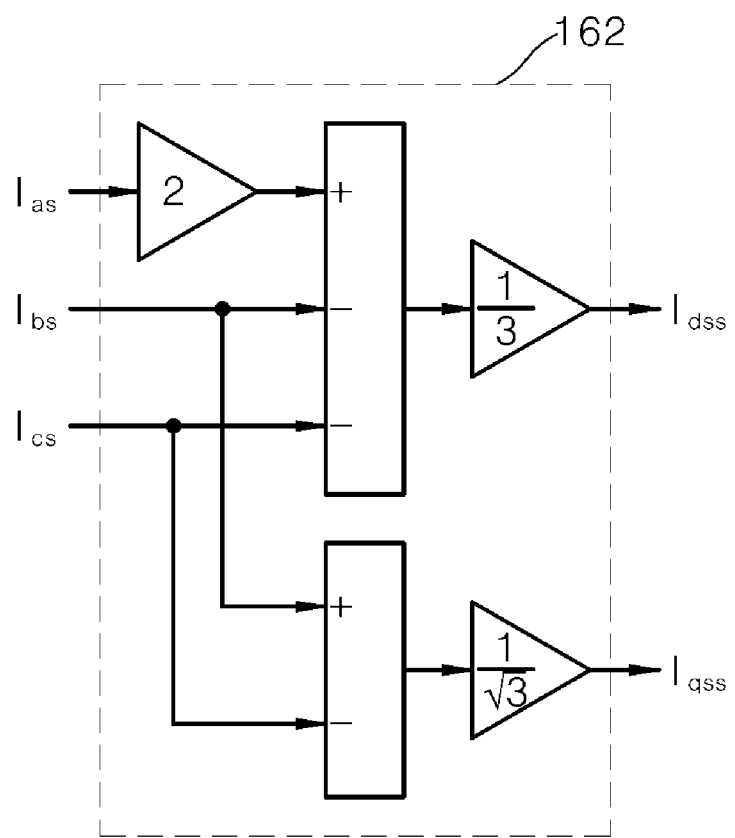
FIG. 8A and FIG. 8B are control configuration diagrams showing a coordinate converting unit shown in FIG. 7.
Figure 8B:
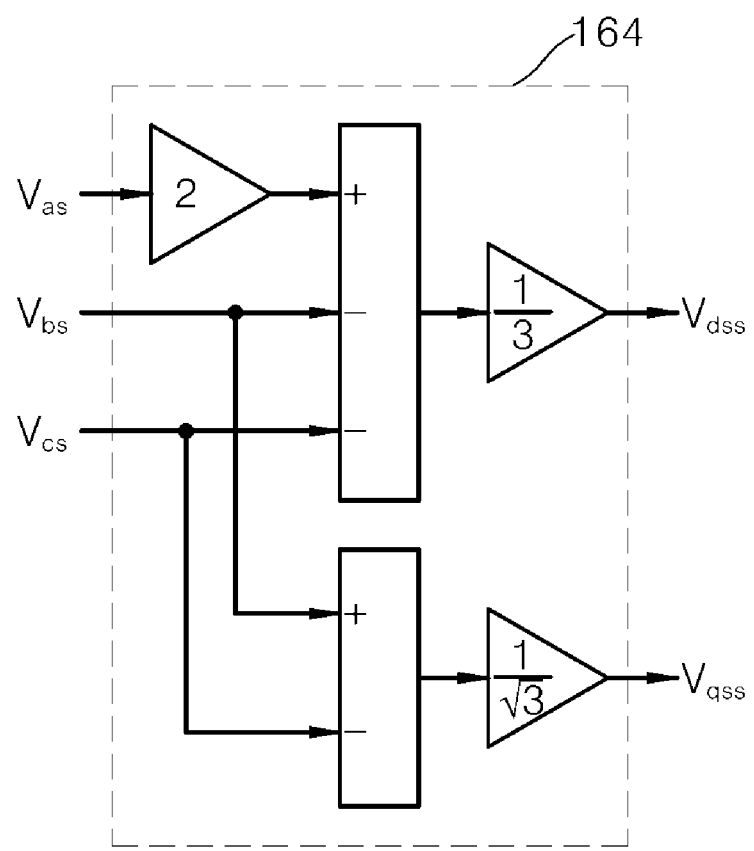
Figure 9A:
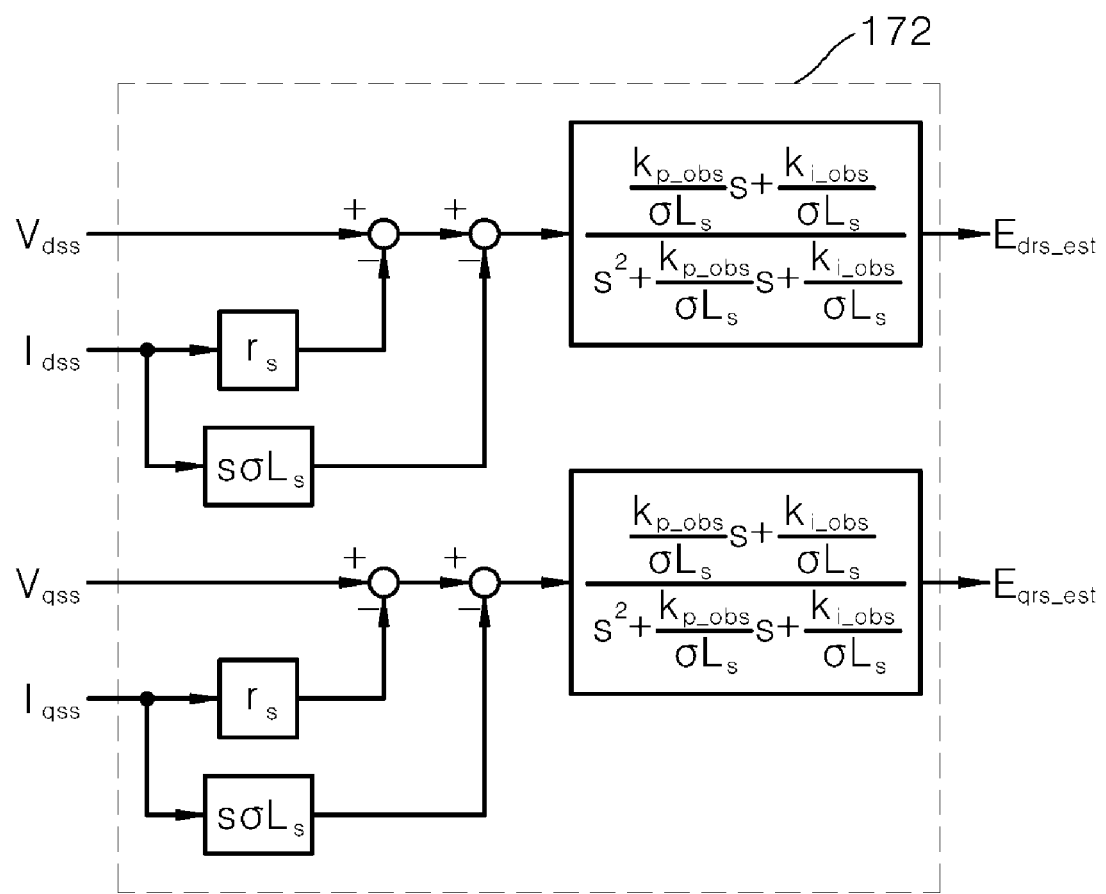
FIG. 9A and FIG. 9B are control configuration diagrams showing a disturbance measurement unit shown in FIG. 7.
Figure 9B:
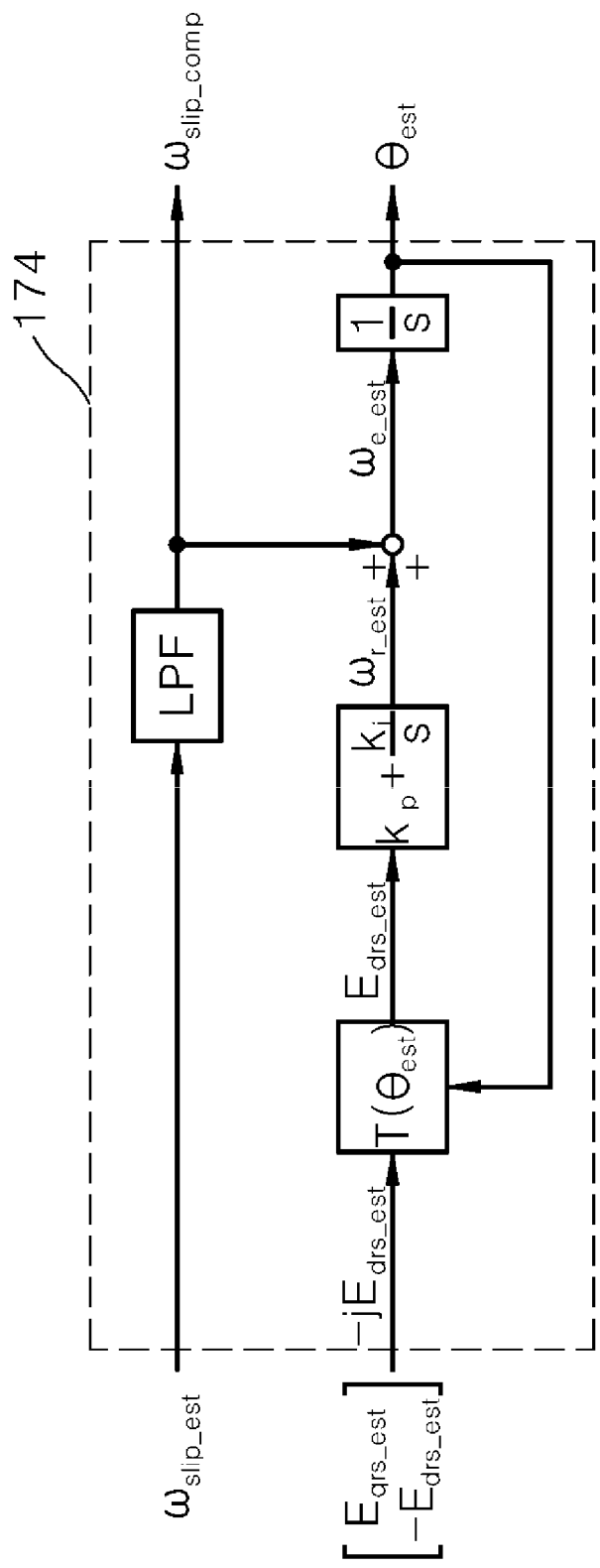
Figure 10A:
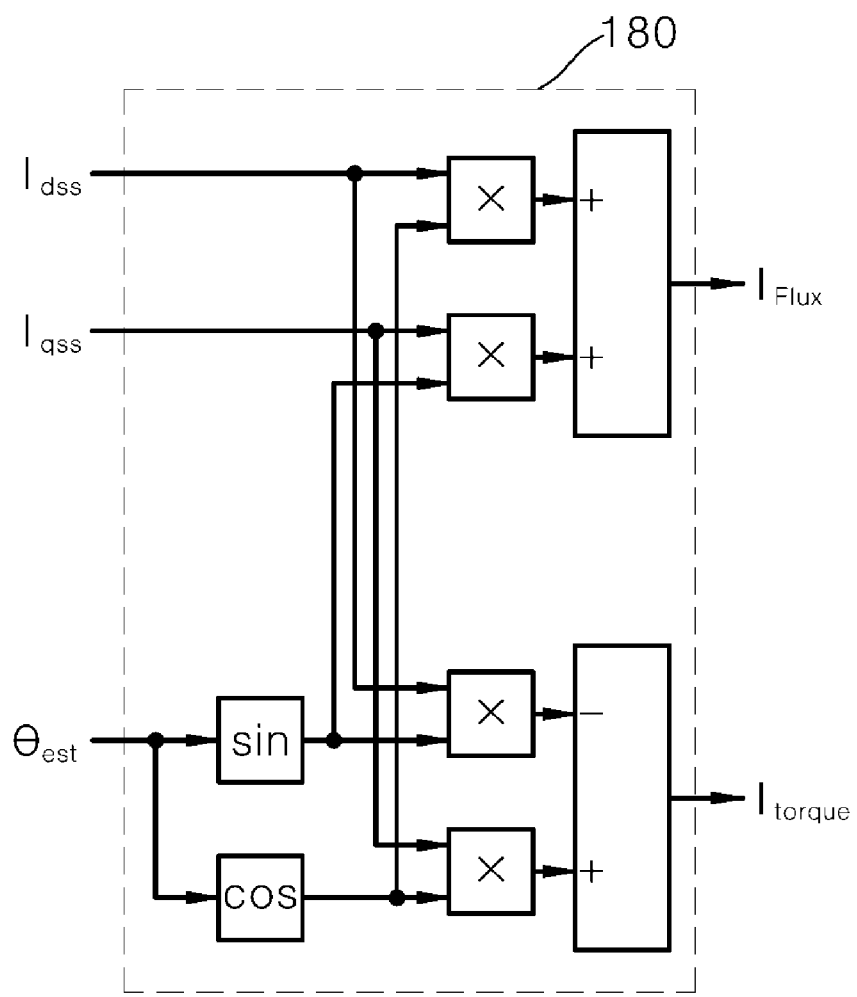
FIG. 10A and FIG. 10B are control configuration diagrams showing a current estimating unit and a frequency estimating unit shown in FIG. 7.
Figure 10B:
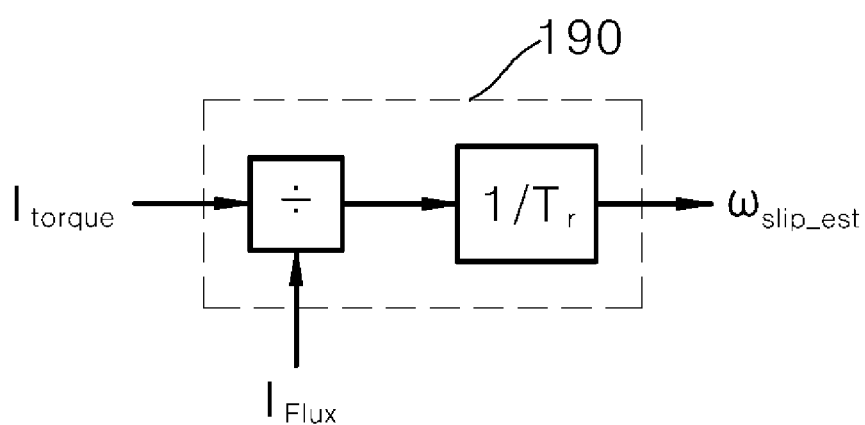

FIG. 7 is a block diagram showing the slip frequency determining unit shown in FIG. 6. FIG. 8A and FIG. 8B are control configuration diagrams showing a coordinate converting unit shown in FIG. 7. FIG. 9A and FIG. 9B are control configuration diagrams showing a disturbance measurement unit shown in FIG. 7. FIG. 10A and FIG. 10B are control configuration diagrams showing a current estimating unit and a frequency estimating unit shown in FIG. 7.

Referring to FIG. 7 to FIG. 10B, the slip frequency determining unit 150 may include a coordinate converting unit 160, a disturbance measurement unit 170, a current estimating unit 180, and a frequency estimating unit 190.

In this connection, FIG. 8A shows a control configuration diagram of a dq-axis phase current converting unit 162 and FIG. 8B shows a control configuration diagram of a dq-axis phase voltage converting unit 164.

The coordinate converting unit 160 may include the dq-axis phase current converting unit 162 and the dq-axis phase voltage converting unit 164.

First, the dq-axis phase current converting unit 162 may convert 3-phases abc-axis stator currents, that is, 3-phases abc-axis currents $I_{as}$, $I_{bs}$, and $I_{cs}$ into dq-axis phase currents $I_{dss}$ and $I_{qss}$ of the stationary coordinate system. The dq-axis phase voltage converting unit 164 may convert 3-phases abc-axis stator voltages, that is, 3-phases abc-axis phase voltages $V_{as}$, $V_{bs}$, and $V_{cs}$ into dq-axis phase voltages $V_{dss}$ and $V_{qss}$ of the stationary coordinate system.

The disturbance measurement unit 170 may include a back electromotive force estimating unit 172 and a phase angle estimating unit 174.

The back electromotive force estimating unit 172 may receive the dq-axis phase currents $I_{dss}$ and $I_{qss}$ and the dq-axis phase voltages $V_{dss}$ and $V_{qss}$ as inputs and estimate back electromotive power of the motor 110 using the dq-axis phase currents $I_{ds}$, and $I_{qss}$, and the dq-axis phase voltages $V_{dss}$ and $V_{qss}$.

The back electromotive force $E_{dqrs\_est}$ of the motor 110 may be estimated using following Equations.

$$V_{dqss} = R_s i_{dqss} + \sigma L_s \frac{d}{dt} i_{dqss} + \frac{L_m}{L_r} \frac{d}{dt} \lambda_{dqrs} \quad \text{[Equation 2]}$$

$$\frac{d}{dt}\begin{bmatrix} i_{dqss} \\ E_{dqrs\_est} \end{bmatrix} = \begin{bmatrix} -\frac{R_s}{\sigma L_s} & -\frac{1}{\sigma L_s} \\ 0 & 0 \end{bmatrix}\begin{bmatrix} i_{dqss} \\ E_{dqrs\_est} \end{bmatrix} + \begin{bmatrix} -\frac{1}{\sigma L_s} \\ 0 \end{bmatrix} V_{dqss} \quad \text{[Equation 3]}$$

In this connection, $V_{dqss}$ is a stator voltage, $i_{dqss}$ is a stator current, $R_s$ is a stator resistance, $\sigma L_s$ is a stator leakage inductance, $L_r$ is a rotor inductance and $L_m$ is a mutual inductance, $\lambda_{dqre}$ is a dq-axis rotor magnetic flux, and $E_{dqrs\_est}$ is the back electromotive force of the motor 110.

In this connection, [Equation 2] is a voltage Equation of the induction motor, and may be expressed as a sum of voltage resulting from a stator impedance composed of the stator resistance and the leakage inductance and the back electromotive force.

That is, [Equation 3] is a state Equation having differential terms of the stator current and the back electromotive force. The back electromotive force estimating unit 172 may be designed from [Equation 3].

$$\dot{i}_{dqss} = \frac{1}{\sigma L_s} V_{dqss} - \frac{R_s}{\sigma L_s} i_{dqss} - \frac{1}{\sigma L_s} E_{dqrs\_est} \quad \text{[Equation 4]}$$

$$\dot{E}_{dqss\_est} = G(i_{dqss\_est} - i_{dqss}) = \quad \text{[Equation 5]}$$
$$G\left(\frac{1}{\sigma L_s} V_{dqss} - \frac{R_s}{\sigma L_s} i_{dqss} - \frac{1}{\sigma L_s} E_{dqrs\_est} - i_{dqss}\right)$$

In this connection, [Equation 4] and [Equation 5] have differential term of estimated current and the back electromotive force as in [Equation 3]. In [Equation 5], a controller may be used to compare a differential term of a measured current and a differential term of the estimated current with each other to estimate the back electromotive force. However, the differential terms may not only complicate the system but also cause system instability. Thus, the differential terms may be removed by defining an arbitrary variable.

$$\xi = E_{dqrs\_est} + Gi_{dqss} \quad \text{[Equation 6]}$$

$$\dot{\xi} = \dot{E}_{dqrs\_est} + G\dot{i}_{dqss} \quad \text{[Equation 7]}$$

In this connection, in [Equation 6], an arbitrary variable $\xi$ is defined. [Equation 7] is a differential term of $\xi$. When applying [Equation 6] and [Equation 7] to [Equation 5], a following [Equation 8] may be acquired.

$$\dot{\xi} = -\frac{G}{\sigma L_s}\xi + \frac{G}{\sigma L_s} V_{dqss} + G\left(\frac{G}{\sigma L_s} - \frac{R_s}{\sigma L_s}\right) i_{dqss} \quad \text{[Equation 8]}$$

$$E_{dqrs\_est} = \xi - Gi_{dqss} \quad \text{[Equation 9]}$$

In this connection, [Equation 8] and [Equation 9] may corresponding to the back electromotive force estimating unit 172 in which the differential term of the current is removed and may be expressed as [Equation 10] and [Equation 11].

$$\left(s + \frac{G}{\sigma L_s}\right)\xi = \frac{G}{\sigma L_s} V_{dqss} + G\left(\frac{G}{\sigma L_s} - \frac{R_s}{\sigma L_s}\right) i_{dqss} \quad \text{[Equation 10]}$$

$$\left(s + \frac{G}{\sigma L_s}\right) E_{dqrs\_est} = \left(s + \frac{G}{\sigma L_s}\right)\xi - \left(s + \frac{G}{\sigma L_s}\right) Gi_{dqss} \quad \text{[Equation 11]}$$

In this connection, s may be a Laplace operator.

[Equation 10] and [Equation 11] result from [Equation 8] and [Equation 9], respectively. When [Equation 11] is applied to [Equation 10], a following [Equation 12] may be acquired.

$$E_{dqrs\_est} = \frac{\frac{G}{\sigma L_s}}{s + \frac{G}{\sigma L_s}}(V_{dqss} - R_s i_{dqss} - s\sigma L_s i_{dqss}) \quad \text{[Equation 12]}$$

In this connection, [Equation 12] represents the back electromotive force estimating unit 172 according to the present disclosure. A polynomial in parentheses on a right side is related to the back electromotive force in [Equation 2]. In [Equation 12], the back electromotive force may be estimated by applying the calculated back electromotive force to a low-pass filter. In this connection, a gain of the back electromotive force estimating unit 172 may act as a cutoff frequency of the low pass filter. When using a proportional controller and a proportional integral controller, transfer functions may be respectively expressed as following [Equation 13] and [Equation 14].

$$E_{dqrs\_est} = \frac{\frac{K_p}{\sigma L_s}}{s + \frac{K_p}{\sigma L_s}}(V_{dqss} - R_s i_{dqss} - s\sigma L_s i_{dqss})$$ [Equation 13]

$$E_{dqrs\_est} = \frac{\frac{K_p}{\sigma L_s}s + \frac{K_i}{\sigma L_s}}{s^2 + \frac{K_p}{\sigma L_s}s + \frac{K_i}{\sigma L_s}}(V_{dqss} - R_s i_{dqss} - s\sigma L_s i_{dqss})$$ [Equation 14]

In this connection, Kp and Ki may be gains of the proportional controller and the proportional integral controller, respectively.

[Equation 13] may correspond to the back electromotive force estimating unit 172 composed of a primary low-pass filter using a proportional controller. [Equation 14] may correspond to the back electromotive force estimating unit 172 composed of a secondary low-pass filter using a proportional integral controller.

In this connection, FIG. 9A shows a control configuration diagram of the back electromotive force estimating unit 172 and FIG. 9B shows a control configuration diagram of the phase angle estimating unit 174.

That is, the back electromotive force estimating unit 172 may estimate the back electromotive force of the motor 110 based on the above-described [Equation 14].

The phase angle estimating unit 174 may include a magnetic flux converting unit, a proportional integral controller, and an integrator. The magnetic flux converting unit may convert the back electromotive force of the motor 110 into the rotation coordinate system back electromotive force phase angle. The proportional integral controller may adjust a q-axis component of the back electromotive force phase angle to 0 to output a frequency of the rotor magnetic flux. The integrator may integrate the frequency of the rotor magnetic flux to output the phase angle of the rotor magnetic flux.

That is, because the back electromotive force phase angle of the motor 110 is 90° ahead of the phase angle of the rotor magnetic flux, the phase angle estimating unit 174 may delay the back electromotive force phase angle by 90° to estimate the phase angle $\theta_{est}$ of the rotor magnetic flux.

FIG. 10A shows a control configuration diagram of the current estimating unit 180 and FIG. 10B shows the frequency estimating unit 190.

The current estimating unit 180 may apply a value obtained by applying the trigonometric function to the phase angle $\theta_{est}$ of the rotor magnetic flux to the dq-axis phase currents $I_{dss}$ and $I_{qss}$ to convert the dq-axis phase currents $I_{dss}$ and $I_{qss}$ not to the active current but to a torque-based current $i_{torque}$ and a magnetic flux-based current $I_{flux}$.

The frequency estimating unit 190 may output an estimated slip frequency $w_{slip\_est}$ based on the torque-based current $I_{torque}$, the magnetic flux-based current $I_{flux}$, and a rotor time constant $T_r$ based on a following Equation 15.

$$\omega_{slip\_est} = \frac{1}{T_r} \cdot \frac{I_{torque}}{I_{Flux}}$$ [Equation 15]

In this connection, $w_{slip\_est}$ is the estimated slip frequency, $T_r$ is the rotor time constant, $I_{torque}$ is the torque-based current, and $I_{flux}$ is the magnetic flux-based current.

The estimated slip frequency $w_{slip\_est}$ calculated based on [Equation 15] may pass through the low pass filter LPE included in the phase angle estimating unit 174 and thus may be outputted as a compensated slip frequency $w_{slip\_comp}$.

The compensated slip frequency $w_{slip\_comp}$ may correspond to the speed error. The inverter controller 130 may determine the operation frequency by adding the slip frequency $w_{slip\_comp}$ to the command frequency, such that the inverter may operate at the constant speed regardless of the load.

The inverter control device according to the present disclosure estimates the back electromotive force and the phase angle of the rotor magnetic flux without phase distortion using the disturbance measurement unit, and estimates and compensates for the slip frequency using the torque-based current and the magnetic flux-based current calculated based on the estimated phase angle of the rotor magnetic flux, such that the inverter may operate at a constant speed regardless of a load.

Further, the inverter control device according to the present disclosure may be applicable to both a low speed operation region and a high speed operation region and thus may easily control the inverter.

The present disclosure as described above may be subject to various substitutions, modifications and changes within the scope of the technical idea of the present disclosure by those with ordinary knowledge in the technical field to which the present disclosure belongs. Thus, the present disclosure is not limited to the accompanying drawings.

What is claimed is:
1. An inverter control device comprising:
 a command voltage generating unit configured to receive a command frequency and output 3-phases PWM voltage to an inverter, based on voltage/frequency operation; and
 a slip frequency determining unit configured to determine a slip frequency based on phase current and phase voltage of a motor driven by the inverter,
 wherein the slip frequency determining unit includes:
  a coordinate converting unit configured to:
   convert the phase current and the phase voltage of the motor to dq-axis phase currents and phase voltages of a stationary coordinate system;
  a disturbance measurement unit configured to:
   estimate a back electromotive force of the motor from the dq-axis currents and voltages; and
   estimate a phase angle of the rotor magnetic flux from the back electromotive force of the motor;
  a current estimating unit configured to apply the phase angle of the rotor magnetic flux to the dq-axis phase currents to convert the dq-axis phase currents to a torque-based current and a magnetic flux-based current of the rotation coordinate system; and a frequency estimating unit configured to output an estimated slip frequency based on the torque-based current, the magnetic flux-based current and a rotor time constant.

2. The inverter control device of claim 1, wherein the coordinate converting unit includes:
   dq-axis phase current converting unit configured to convert 3-phases stator currents into dq-axis phase currents of the stationary coordinate system; and
   dq-axis phase voltage converting unit configured to convert 3-phases stator voltages into dq-axis phase voltages of the stationary coordinate system.

3. The inverter control device of claim 1, wherein the disturbance measurement unit includes:
   a back electromotive force estimating unit configured to apply a stator resistance and a leakage inductance to the dq-axis phase currents and voltages and pass the dq-axis phase currents and voltages through a low-pass filter to estimate a back electromotive force of the motor; and
   a phase angle estimating unit configured to estimate the phase angle of the rotor magnetic flux from the back electromotive force of the motor.

4. The inverter control device of claim 3, wherein the back electromotive force estimating unit is configured to estimate the back electromotive force of the motor based on a following [Equation]:

$$E_{dqrs\_est} = \frac{\frac{K_p}{\sigma L_s}s + \frac{K_i}{\sigma L_s}}{s^2 + \frac{K_p}{\sigma L_s}s + \frac{K_i}{\sigma L_s}}(V_{dqss} - R_s i_{dqss} - s\sigma L_s i_{dqss})$$ [Equation]

where $E_{dqrs\text{-}est}$ is the back electromotive force, Kp and Ki are respectively gains of a proportional controller and a proportional integral controller, $R_s$ is the stator resistance, s is a Laplace operator, $\sigma L_s$ is the leakage inductance, $V_{dqss}$ is the dq-axis phase voltage, and $i_{dqss}$ is the dq-axis phase current.

5. The inverter control device of claim 3, wherein the phase angle estimating unit includes:
   a magnetic flux converting unit configured to convert the back electromotive force of the motor into a rotation coordinate system back electromotive force phase angle;
   a proportional integral controller configured to adjust a q-axis component of the back electromotive force phase angle to 0 to output a frequency of the rotor magnetic flux; and
   an integrator configured to integrate the frequency of the rotor magnetic flux to output the phase angle of the rotor magnetic flux.

6. The inverter control device of claim 5, wherein the phase angle estimating unit further includes a low-pass filter configured to pass the estimated slip frequency therethrough to output a compensated slip frequency.

7. The inverter control device of claim 3, wherein the frequency estimating unit is configured to output the estimated slip frequency based on a following [Equation]:

$$\omega_{slip\_est} = \frac{1}{T_r} \cdot \frac{I_{torque}}{I_{Flux}}$$ [Equation]

wherein $w_{slip\_est}$ is the estimated slip frequency, $T_r$ is the rotor time constant, $I_{torque}$ is the torque-based current, and $I_{flux}$ is the magnetic flux-based current.

8. The inverter control device of claim 1, wherein the current estimating unit is configured to apply a value obtained by applying a trigonometric function to the phase angle of the rotor magnetic flux to the dq-axis phase currents to convert the dq-axis phase currents to a torque-based current and a magnetic flux-based current.

* * * * *